United States Patent [19]

Toft

[11] 4,221,842

[45] Sep. 9, 1980

[54] SNACK FOOD PROCESS

[75] Inventor: John G. Toft, Leicester, England

[73] Assignee: Standard Brands Incorporated, Wilton, Conn.

[21] Appl. No.: 29,587

[22] Filed: Apr. 12, 1979

Related U.S. Application Data

[63] Continuation of Ser. No. 793,990, May 5, 1977, abandoned.

[30] Foreign Application Priority Data

May 6, 1976 [GB] United Kingdom ............... 18533/76
Feb. 18, 1977 [GB] United Kingdom ................. 7046/77

[51] Int. Cl.² .......................... A23L 1/216; A23L 1/01
[52] U.S. Cl. ................................... 426/550; 426/438; 426/637; 426/808
[58] Field of Search ............... 426/439, 438, 440, 497, 426/502, 503, 505, 808, 523, 458, 550, 556, 560, 549, 622, 637

[56] References Cited

U.S. PATENT DOCUMENTS

| | | | |
|---|---|---|---|
| 3,027,258 | 3/1962 | Markakis et al. | 426/438 X |
| 3,297,450 | 1/1967 | Loska | 426/550 |
| 3,332,781 | 6/1967 | Benson et al. | 426/502 X |
| 3,348,950 | 10/1967 | Weiss | 426/439 X |
| 3,539,356 | 11/1970 | Benson et al. | 426/550 |
| 3,656,966 | 4/1972 | Ball et al. | 426/458 X |
| 3,698,915 | 10/1972 | Glasgow | 426/439 X |
| 3,925,563 | 12/1975 | Straugh et al. | 426/439 X |
| 3,966,990 | 6/1976 | Cremer et al. | 426/550 |
| 3,991,222 | 11/1976 | Beck et al. | 426/550 |
| 3,993,788 | 11/1976 | Longenecker | 426/523 X |
| 3,998,975 | 12/1976 | Liepa | 426/550 |

OTHER PUBLICATIONS

Talburt et al; "Potato Processing" Ed. 2; The AVI Pub. Co. Inc., Westport, Conn. 1967.

*Primary Examiner*—Kenneth M. Schor

[57] ABSTRACT

Potato solids having present substantially intact potato cells are provided in a dough which is cooked and formed into pieces having a moisture content of from about 9 to about 13 percent by weight and the pieces fried.

10 Claims, No Drawings

SNACK FOOD PROCESS

This is a continuation of application Ser. No. 793,990, filed May 5, 1977, now abandoned.

BACKGROUND OF THE INVENTION

The present invention relates both to a fried foodstuff and to a process for producing the same.

The foodstuff with which this invention is particularly concerned is a crispy, expanded snack food resembling a French fried potato stick. The invention is equally applicable however to a fried snack food of any desired cross-sectional form, optionally with a hollow centre or to a ball.

In accordance with the broadest aspect of the present invention there is provided a process for preparing a fried foodstuff which comprises blending a naturally-occuring edible starch with a farinaceous material and a binder to form a uniformly blended dough, permitting the dough to equilibrate for a period of at least 45 minutes, cooking said dough and forming it into a plurality of pieces of desired shape, storing said plurality of pieces in a controlled humidity atmosphere until the moisture content lies within the range 9 to 13 percent by weight and frying the plurality of pieces in an edible oil. Preferably the edible starch comprises potato solids having substantially intact potato cells.

The potato solids may be potato granules, potato granules together with potato flakes, potato granules together with mashed cooked potato, or potato granules together with potato flakes and mashed cooked potato.

The farinaceous material may be potato flour and the binder acetylated mono glyceride. The potato solids may be dry mixed following which water, preferably warmed, may be added. If, however, the potato solids included cooked, mashed whole potato then the mix may be sufficiently moist as to make the addition of water unnecessary. The dough may be formed into a plurality of small pieces by extrusion and cutting, in which case a lubricant may be added to the dough blend to facilitate the passage thereof through the extruder. A suitable lubricant comprises distilled mono glyceride emulsifier.

Whereas the dough will produce a satisfactory foodstuff when allowed to equilibrate over a period of at least 45 minutes, it is preferred that the dough be allowed to equilibrate for a period in excess of one hour. During equilibration moisture enters and penetrates the substantially intact potato cells and at the same time is absorbed by the other potato solids and the farinaceous components to give a substantially homogenous dough.

In a preferred embodiment of the invention equilibrated dough is fed to a cooking and forming extruder having primary and secondary cooking zones. The dough is kept cool until it enters the primary zone when it is raised to a temperature within the range 100°–125° C. The dough then passes to the secondary zone where its temperature is maintained in the range 70° to 100° C. At this latter temperature the dough is forced through the section where it is extruded through a die to form a continuous ribbon having a thickness within the range 1.0 mm to 25.0 mm. It will be appreciated that the die may have any desired cross-sectional shape such, for example, as a star or ring.

In a second preferred embodiment of the invention equilibrated dough is fed to a cooking and forming extruder having primary, secondary and tertiary cooking zones. The dough is kept cool until it enters the primary zone where it is raised to a temperature within the range 70°–120° C. The dough then passes to a secondary zone where the temperature is maintained in the range 70°–120° C., and from there passes to the tertiary zone where the temperature is lowered to the range 60°–100° C. The dough is then extruded into a ribbon as described in the first embodiment.

The ribbon of extruded cooked dough is allowed to cool under ambient temperature or forced draught conditions for a period of 1 to 2 minutes. During this period the ribbon may be supported upon a conveyor belt and moisture permitted to evaporate from the surface thereof giving rise to slight hardening. In this way, when the ribbon is sliced into lengths, adjacent lengths do not tend to bond one to the other. Following hardening, the ribbon is sliced into cut lengths by means of a rotary cutter the speed of rotation of which is matched to the speed of the conveyor belt upon which ribbons of extruded cooked dough are supported.

The cut pieces of cooked dough are then stored at a relative humidity of from about 10 to about 60 percent at a temperature of from about 15° to 27° C. for a period of from about 10 to about 48 hours. Under these conditions the dough loses moisture at a controlled and even rate and the dough is maintained under the controlled humidity conditions until its moisture content falls to 9 to 13 per cent by weight and preferably 10–12 per cent by weight. Alternatively, the pieces may be removed from storage when the pieces have attained a moisture content about 15 per cent and dried to a moisture level of about 10 to 12 per cent by gently blowing controlled atmosphere air over the surface of the pieces in a bin dryer or the like.

Once the moisture content has been achieved the individual semi-processed products are fried in an edible oil at a temperature of 160° C. to 210° C. for a period of 10 to 60 seconds. It is much preferred though not essential, that the semi-processed products are immersed in the edible oil during frying. In this way the mositure content of the fried foodstuff may be reduced to less than 3 percent by weight and oil is absorbed as a necessary integral part of the product. The fried foodstuff may optionally be flavoured externally with salt or other suitable flavouring prior to packaging.

In accordance with another aspect of the invention there is provided a fried foodstuff prepared by the process recited hereinabove.

The invention will now be described further by way of example:

EXAMPLE I (a) Preparation of Granulated Potato Dough

The following dry ingredients were mixed to provide a homogenous mixture.

1920 gm potato granules (including substantially intact potato cells)
480 gm potato flour
12 gm distilled monoglyceride emulsifier
6 gm monosodium glutamate
2 gm acetylated monoglyceride emulsifier Following dry mixing, 500 gm of water at a temperature of 65° to 75° C. were added in the form of a fine spray. The wetted mixture was agitated for a period of 3 minutes in order to produce a granulated homogenous moist dough. The moist dough was then allowed to equilibrate for a period of one hour.

(b) Cooking and Forming

The equilibrated dough was fed, under cool conditions, to a known cooking and forming extruder having primary and secondary cooking zones. In the primary zone the dough temperature was raised to 120° C. following which the dough temperature was lowered to 90° C. in the secondary cooking zone. The cooked dough was then extruded at an extruder flow rate of 13 kg/hour into a continuous ribbon which was supported upon a belt conveyor. The cross-section of the extruded ribbon was rectangular having dimensions of 35 mm by 1.5 mm.

(c) Cutting and Conditioning

The extruded cooked dough ribbon was allowed to cool under ambient temperature conditions for a period of 1 minute whilst supported on the belt conveyor. The ribbon was then cut into lengths by means of a known rotary cutter. The cut lengths were then conditioned and partially dried by storage in a room having a relative humidity of 45 percent and an air temperature of 20° C. for a period of 25 hours after which time the moisture content of the cut lengths was reduced to 10 percent by weight.

(d) Frying

The conditioned lengths of cooked dough (known as half products) were then fried in an edible oil at a temperature of 190° C. for a period of 15 seconds. The moisture content of the fried foodstuff which resulted was found to be less than 3 percent by weight with an oil content of about 25 percent. Salt was added for flavouring.

EXAMPLE 2

The sequence outlined in EXAMPLE I was repeated with the exception that a proportion of the potato granules and potato flour in the ratio 2:1 was replaced by cooking mashed whole potato solids (having substantially intact potato cells). In this example no added water needed, the necessary moisture being derived from the mashed potato.

EXAMPLE 3

The ingredients set out in EXAMPLE I were taken with the exception of the 500 gm of water. The ingredients were mixed as described and cooked, mashed whole potato added to the mix to produce the potato dough. The remaining steps set out in EXAMPLE I were then followed.

In a still further embodiment of the invention the extruded ribbon or rope is cut in a vertical axis immediately upon issuing from the extruder die head. The cut pieces fall onto a belt conveyor moving at such a speed as to keep the individual cut pieces separate for a period of at least one minute and preferably two minutes, whilst they cool under ambient temperature and/or forced draught conditions. This prevents the pieces adhering one to another.

It is essential to this invention that the potato solids include whole potato cells which have not been disrupted and therefore have substantially intact cell walls and contents since it is these substantially intact potato cells which provide the fried foodstuff with a close texture having the inherent natural flavour of fried potato. It is essential to the invention too that the potato dough is allowed to equilibrate for a period of time sufficient to permit moisture to penetrate the majority and preferably all, of the potato cells and be absorbed by the other potato solids and farinaceous components. In this way the dough presented for cooking is consistent, or substantially so, throughout thus giving rise to fried foodstuff of consistent quality.

What is claimed is:

1. A process for preparing a snack food comprising the sequential steps of:
    (a) preparing a dough comprising potato solids having present substantially intact potato cells, moisture, farinaceous material and a binder;
    (b) equilibrating the dough for a period sufficient to permit the dough ingredients to be substantially penetrated by the moisture;
    (c) passing the equilibrated dough through a cooking and forming extruder having two cooking zones, the temperature of the first zone being sufficient to heat the dough to a temperature of from about 100° to about 125° C. and the temperature of the second zone being sufficient to heat the dough to a temperature of from about 70° to about 100° C. the temperature of the first zone being higher than the temperature of the second zone;
    (d) extruding the cooked dough directly from the second zone into a continuous ribbon;
    (e) cooling the ribbon to harden the surface thereof;
    (f) dividing the hardened ribbon into pieces;
    (g) conditioning the pieces by maintaining the same at a relative humidity of from about 10 to about 50 percent and a temperature of from about 15° to about 27° C. for a period of from about 10 to about 48 hours until the moisture content of said pieces is in the range of from about 9 to about 13 percent, based on the weight of the pieces such that the pieces lose moisture at a controlled and even rate, and
    (h) frying the conditioned pieces having a moisture of about 9 to about 13 percent.

2. A process for preparing a snack food comprising the sequential steps of:
    (a) preparing a dough comprising potato solids having present substantially intact potato cells, moisture, farinaceous material and a binder;
    (b) equilibrating the dough for a period sufficient to permit the dough ingredients to be substantially penetrated by the moisture;
    (c) passing the equilibrated dough through a cooking and forming extruder having three cooking zones, the temperature of the first and second zones being sufficient to heat the dough to a temperature of from about 70° to about 120° C. and the temperature of the third zone being sufficient to heat the dough to a temperature of from about 60° to about 100° C. the temperature of the first zone being higher than the temperature of the following zones;
    (d) extruding the cooked dough directly from the second zone into a continuous ribbon;
    (e) cooling the ribbon to harden the surface thereof;
    (f) dividing the hardened ribbon into pieces;
    (g) conditioning the pieces by maintaining the same at a relative humidity of from about 10 to about 50 percent and a temperature of from about 15° to about 27° C. for a period of from about 10 to about 48 hours until the moisture content of said pieces is in the range of from about 9 to about 13 percent, based on the weight of the pieces such that the pieces lose moisture at a controlled and even rate, and (h) frying the conditioned pieces having a moisture of about 9 to about 13 percent.

3. A process for preparing a snack food as defined in claim 1 or 2, wherein the potato solids are provided in the form of potato granules.

4. A process for preparing a snack food as defined in claim 3, wherein the potato solids are provided in the form of potato granules together with material selected from the group consisting of potato flakes, mashed cook potato and a combination of these materials.

5. A process for preparing a snack food as defined in claim 4, wherein the farinaceous material is potato flour.

6. A process for preparing a snack food as defined in claim 5, wherein the binder is acetylated mono glyceride.

7. A process for preparing a snack food as defined in claim 6, wherein the moisture content of the pieces is in the range of from about 10 to about 12 percent by weight.

8. A process for preparing a snack food as defined in claim 7, wherein the dough is equilibrated for a period of at least about 45 minutes.

9. A process for preparing a snack food as defined in claim 8, wherein the pieces are maintained for a period of about 25 hours at a relative humidity of about 45 percent at a tempeature of about 20° C.

10. A process for preparing a snack food as defined in claim 9, wherein the fried pieces have a moisture content of less than about 2 percent.

* * * * *